(12) United States Patent
Li

(10) Patent No.: US 8,542,684 B2
(45) Date of Patent: Sep. 24, 2013

(54) ARP PACKET PROCESSING METHOD, COMMUNICATION SYSTEM AND DEVICE

(75) Inventor: Zhenhai Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 630 days.

(21) Appl. No.: 12/614,206

(22) Filed: Nov. 6, 2009

(65) Prior Publication Data

US 2010/0054253 A1 Mar. 4, 2010

Related U.S. Application Data

(63) Continuation of application No. PCT/CN2008/070532, filed on Mar. 19, 2008.

(30) Foreign Application Priority Data

Jul. 20, 2007 (CN) .......................... 2007 1 0129994

(51) Int. Cl.
*H04L 12/28* (2006.01)

(52) U.S. Cl.
CPC ..................................... *H04L 45/00* (2013.01)
USPC ........... 370/392; 370/338; 370/389; 370/396; 370/400; 370/401; 709/230; 709/245; 726/13; 726/22

(58) Field of Classification Search
None
See application file for complete search history.

(56) References Cited

U.S. PATENT DOCUMENTS

| | | | |
|---|---|---|---|
| 5,708,654 A * | 1/1998 | Arndt et al. ................... 370/242 |
| 6,771,649 B1 | 8/2004 | Tripunitara et al. |
| 7,237,267 B2 | 6/2007 | Rayes et al. |
| 7,263,559 B2 * | 8/2007 | Yao et al. ....................... 709/230 |
| 7,356,032 B1 * | 4/2008 | Sumorok ....................... 370/392 |
| 7,490,351 B1 * | 2/2009 | Caves et al. ...................... 726/13 |
| 7,551,559 B1 * | 6/2009 | Jonnala et al. ................ 370/230 |
| 7,742,478 B2 * | 6/2010 | Sekiguchi et al. ............. 370/392 |
| 2004/0059909 A1 | 3/2004 | Le Pennec et al. |
| 2005/0262234 A1 | 11/2005 | Gassoway |
| 2006/0209818 A1 * | 9/2006 | Purser ........................... 370/389 |

FOREIGN PATENT DOCUMENTS

| | | |
|---|---|---|
| CN | 1420705 | 5/2003 |
| CN | 1426207 | 6/2003 |
| CN | 1466341 A | 1/2004 |
| CN | 1484405 | 3/2004 |

(Continued)

OTHER PUBLICATIONS

Yang, et al, 2004. "Forwarding and Control Element Separation (ForCES) Framework." Networking Group, Request for Comments: 3746.
Khosravi, et al, 2003. "Requirements for Separation of IP Control and Forwarding." Network Working Group, Request for Comments: 3654.
Written Opinion of the International Searching Authority for International application No. PCT/CN2008/070532, mailed May 8, 2008, 5 pgs.

(Continued)

*Primary Examiner* — Jae Y Lee
*Assistant Examiner* — Aixa A Guadalupe-Cruz
(74) *Attorney, Agent, or Firm* — Brinks Hofer Hofer & Lione

(57) ABSTRACT

An Address Resolution Protocol (ARP) packet processing method, a communication system and a device are disclosed. The method includes: receiving an ARP packet, and judging the type of the ARP packet; when the ARP packet is an ARP request, responding to the ARP request if an entry corresponding to the ARP request is found in a local ARP table; and when the ARP packet is an ARP response, reporting the ARP response if an entry corresponding to the ARP response is found in the local ARP table and a reporting parameter in the entry indicates permission of reporting; or discarding the ARP response if no entry corresponding to the ARP response is found in the ARP table.

7 Claims, 4 Drawing Sheets

(56) References Cited

FOREIGN PATENT DOCUMENTS

| CN | 1534933 A | 10/2004 |
|---|---|---|
| CN | 1764129 | 4/2006 |
| CN | 1829190 | 9/2006 |
| CN | 1852253 | 10/2006 |
| CN | 1855929 A | 11/2006 |
| CN | 1870627 A | 11/2006 |
| CN | 1925493 | 3/2007 |
| CN | 1946041 | 4/2007 |
| CN | 101094236 A | 12/2007 |
| WO | WO2005/114909 | 12/2005 |

OTHER PUBLICATIONS

European Patent Office Communication enclosing the extended European search report including, pursuant to Rule 62 EPC, the supplementary European search report (Art. 153(7) EPC) and the European search opinion for application No. 08715268.2, dated Mar. 16, 2010, 5 pgs.

First Office Action of the State Intellectual Property Office of the PRC for Chinese application No. 200710129994.7, dated May 8, 2009, 7 pgs., partial English translation attached.

* cited by examiner

ARP PACKET PROCESSING METHOD, COMMUNICATION SYSTEM AND DEVICE

CROSS-REFERENCE TO RELATED APPLICATIONS

This application is a continuation of International Application No. PCT/CN2008/070532, filed on Mar. 19, 2008, which claims priority to Chinese Patent Application No. 200710129994.7, filed on Jul. 20, 2007, both of which are hereby incorporated by reference in their entireties.

FIELD OF THE INVENTION

The present invention relates to communications, and in particular, to an Address Resolution Protocol (ARP) packet processing method, a communication system and a device.

BACKGROUND OF THE INVENTION

ARP is one of the lower-layer protocols in the Transmission Control Protocol/Internet Protocol (TCP/IP) stack. ARP is designed to translate an IP address into an Ethernet physical address, namely, a Media Access Control (MAC) address.

The communications between Ethernet devices use MAC addresses for addressing, while various TCP/IP applications use IP addresses for addressing. Various data packets finally need to be encapsulated into Ethernet frames for transmission. Therefore, before performing IP communications, the MAC address of the other side needs to be obtained through resolving the IP address of the other side. The protocol responsible for the resolution process is ARP.

To speed up the address translation, a network device uses the ARP cache technology when implementing the ARP, and uses a table structure to cache a certain quantity of address mapping relations locally. The table is generally known as an ARP table.

In the existing network, however, ARP-based network attacks generally exist. From the perspective of the attack principles, ARP attacks fall into the following two types:

1. Address spoofing: The attacker sends an ARP request or an ARP response which has an erroneous address mapping relation to alter the ARP table of the host or the gateway. Consequently, the gateway or host sends the packet to an erroneous physical address, and the attack works.

2. ARP Denial of Service (DoS) attack: The ARP DoS attacked is generally targeted at gateway devices (such as a router or a switch). ARP packets are generally processed on the control plane of the device. The control plane generally uses a universal CPU as a processing engine. The universal CPU is characterized by sophisticated processing but limited performance. With too many processing tasks, the CPU on the control plane tends to be overloaded or crash. In view of the foregoing weakness, the ARP DoS attacker sends ARP packets of high traffic to the gateway device to make the control plane of the device extremely busy and unable to process normal ARP packets, and the attack works.

An ARP packet processing method in the prior art is as follows:

First, the IP address of each ARP packet is checked on the forwarding plane, and the illegal ARP packets are discarded.

The IP address check includes:

1. Checking the destination IP address: check whether the destination IP address is the IP address in the network segment of the gateway; if not, discard the packet; and 2. Checking the source IP address: check whether the source IP address is a "legal" IP address. "Legal" means that the IP address has already been in the entries of the ARP table. For such packets, the sending priority is high; for other ARP packets, the sending priority is low.

However, the foregoing technology is unable to prevent the attacks with legal IP addresses.

To overcome the defect of the foregoing solution, another ARP packet processing method in the prior art is:

responding to the ARP request on the forwarding plane directly by using the high-speed processing capability of the network processor on the forwarding plane.

ARP packets are categorized into ARP request and ARP response. The foregoing solution deals with only ARP request, and is unable to solve the problem that high-traffic attacks using ARP response.

SUMMARY OF THE INVENTION

Embodiments of the present invention provide an ARP packet processing method, a communication system, and a device to prevent network attacks launched with ARP packets.

An ARP packet processing method includes:

receiving an ARP packet, and judging the type of the ARP packet;

when the ARP packet is an ARP request, responding to the ARP request if an entry corresponding to the ARP request is found in a local ARP table; and when the ARP packet is an ARP response, reporting the ARP response if an entry corresponding to the ARP response is found in the local ARP table and the reporting parameter in the entry indicates permission of reporting; or discarding the ARP response if no entry corresponding to the ARP response is found in the ARP table.

A communication system includes:

a forwarding plane processor, adapted to judge the type of the received ARP packet; when the ARP packet is an ARP request, respond to the ARP request according to an entry corresponding to the ARP request in the ARP table; when the ARP packet is an ARP response, judge whether the reporting parameter in an entry corresponding to the ARP response indicates permission of reporting according to the entry corresponding to the ARP response in the ARP table; if the reporting parameter indicates permission of reporting, report the ARP response; if no entry corresponding to the ARP response is found in the ARP table, discard the ARP response; and a control plane processor, adapted to receive the ARP request or ARP response reported by the forwarding plane processor.

A forwarding plane processor provided in an embodiment of the present invention includes:

a judging unit, adapted to judge the type of a received ARP packet;

a first searching unit, adapted to search a local ARP table when the ARP packet is an ARP request;

a responding unit, adapted to respond to the ARP request if an entry corresponding to the ARP request is found in the ARP table;

a second searching unit, adapted to search the local ARP table when the ARP packet is an ARP response; and a discarding unit, adapted to discard the ARP response if no entry corresponding to the ARP response is found in the ARP table.

In the embodiments of the present invention, the forwarding plane processor can respond to a received ARP request directly rather than generate an ARP entry according to the ARP request, thus eliminating the possibility of using ARP request to commit address spoofing to the ARP table. Besides, when receiving an ARP response, the forwarding plane processor reports only the ARP response permitted to be reported in the ARP table, thus eliminating the possibility of attacks using multitudinous ARP response.

DETAILED DESCRIPTION OF THE INVENTION

The embodiments of the present invention provide an ARP packet processing method, a communication system, and a forwarding plane processor to prevent network attacks using ARP packets.

Figure 1:
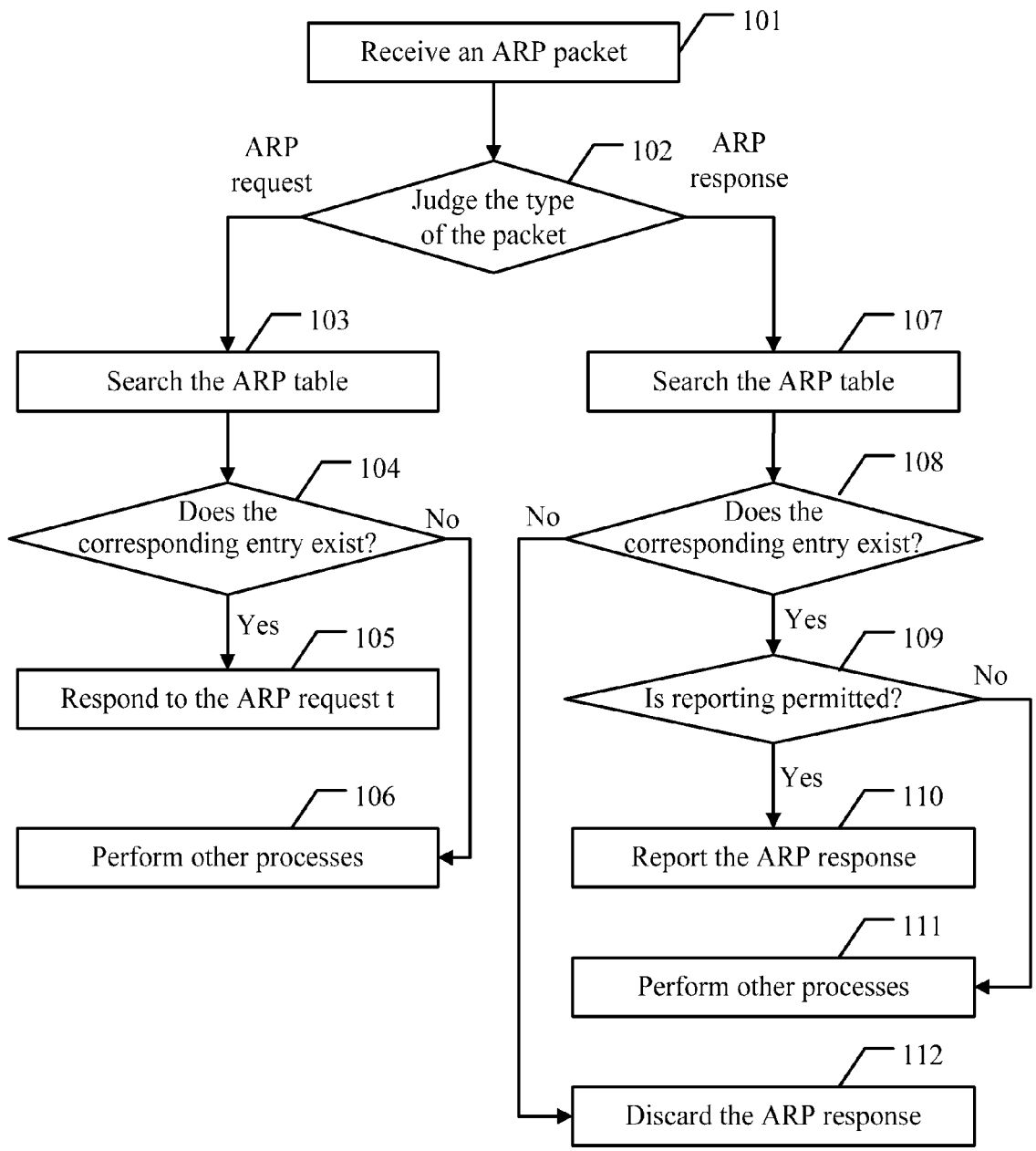
FIG. 1 is a flowchart of an ARP packet processing method in an embodiment of the present invention.

FIG. 1 is a flowchart of an ARP packet processing method in an embodiment of the present invention. The method includes:

101. Receiving an ARP Packet.

The forwarding plane processor receives an ARP packet sent by an external device.

Generally, a high-end data communication device (such as high-end routers or switches) includes three relatively independent planes: control plane, forwarding plane, and management plane.

The control plane generally uses a universal CPU as a processing engine, and is responsible for processing sophisticated protocols (such as a routing protocol).

The forwarding plane is responsible for high-speed data forwarding.

The management plane is responsible for network management, command lines, logs and alarms.

In this embodiment, the forwarding plane processor may be a processing system composed of a single-core or multi-core CPU, or a network processor, or a Application Specific Integrated Circuit (ASIC) processor, and the peripherals required for the operation of such components. Examples of the peripherals are: Random Access Memory (RAM), or Ternary Content Addressable Memory (TCAM), or Flash memory.

102. Judging the type of the ARP packet. If the ARP packet is an ARP request, 103 is carried out; if the ARP packet is an ARP response, 107 is carried out.

How to judge the type of the ARP packet is based on the prior art, and is not detailed here further.

103. Searching the ARP table.

The ARP table in the forwarding plane processor is searched according to the obtained ARP request.

In this embodiment, the ARP table in the forwarding plane processor may be delivered by the control plane processor to the forwarding plane processor, or configured in the forwarding plane processor directly.

In this embodiment, the corresponding relation between the IP address of the gateway interface and the MAC address is included in the entry of the ARP table. When the Virtual Router Redundancy Protocol (VRRP) is enabled on the interface, the entry needs to be maintained according to the state change of VRRP.

A flag bit may be set in entry of the ARP table to indicate whether the entry is a gateway ARP entry or a proxy ARP entry.

104. Judging whether an entry corresponding to the obtained ARP request is in the ARP table; if so, 105 is carried out; otherwise, 106 is carried out.

How to judge will be detailed in the subsequent embodiment later.

105. Responding to the ARP request.

If an entry corresponding to the obtained ARP request is found in the ARP table, the forwarding plane processor responds to the ARP request. How to response will be detailed in the subsequent embodiment later.

106. Performing other processes.

If no entry corresponding to the obtained ARP request is found in the ARP table, the forwarding plane processor performs other processes. Such processes will be detailed in the subsequent embodiment later.

107. Searching the ARP table.

The ARP table in the forwarding plane processor is searched according to the obtained ARP response.

In this embodiment, the ARP table in the forwarding plane processor may be delivered by the control plane processor to the forwarding plane processor, or configured in the forwarding plane processor directly.

108. Judging whether an entry corresponding to the obtained ARP response is in the ARP table; if so, 109 is carried out; otherwise, 112 is carried out.

109. Judging whether the reporting parameter in the corresponding entry indicates permission of reporting. If the reporting parameter indicates permission, 110 is carried out; otherwise, 111 is carried out.

110. Reporting the ARP response.

When the reporting parameter in the entry corresponding to the ARP response indicates permission of reporting, the forwarding plane processor reports the ARP response to the control plane processor.

111. Performing other processes.

If the reporting parameter in the entry corresponding to the ARP response indicates no permission of reporting, the forwarding plane processor performs other processes. Such processes will be detailed in the subsequent embodiment later.

112. Discarding the ARP response.

If no entry corresponding to the obtained ARP response is in the ARP table, the ARP response is discarded.

In the foregoing embodiment, the forwarding plane processor responds to the received ARP request directly instead of generating an ARP entry according to the ARP request, thus eliminating the possibility of using ARP request to commit address spoofing to the ARP table. Besides, when receiving an ARP response, the forwarding plane processor reports only the ARP response permitted to be reported in the ARP table, thus eliminating the possibility of attacks using multitudinous ARP response.

The method for processing each type of ARP packet is explained in detail below:

I. Processing an ARP Request

Figure 2:
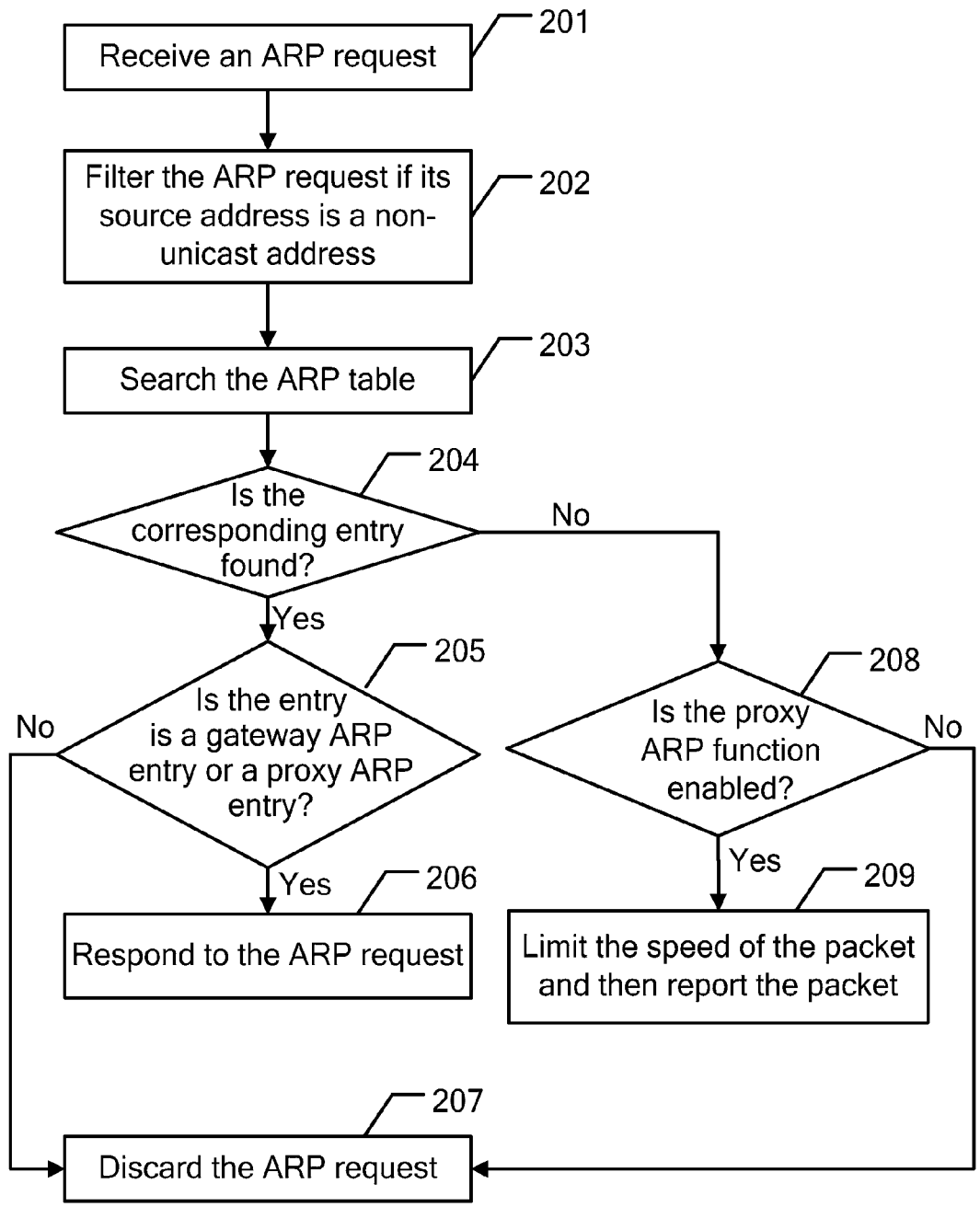
FIG. 2 is a flowchart of processing an ARP request in an embodiment of the present invention.

FIG. 2 is a flowchart of an ARP request processing method in an embodiment of the present invention. The method includes:

201. Receiving an ARP request.

The forwarding plane processor receives an ARP request sent by an external device.

202. Filtering the ARP request if the source MAC address of the ARP request is a non-unicast address.

How to filter the ARP request is based on the prior art, and is not detailed here further.

203. Searching the ARP table.

The parameters such as port number, Virtual Local Area Network (VLAN) ID, and destination IP address are obtained from the received ARP request, and the ARP table stored locally in the forwarding plane processor is searched according to the obtained parameters.

204. Judging whether an entry corresponding to the obtained ARP request is in the ARP table; if so, 205 is carried out; otherwise, 208 is carried out.

205. Judging whether the ARP request is a gateway ARP request or a proxy ARP request; if so, 206 is carried out; otherwise, 207 is carried out.

The judgment is implemented by checking a "gateway ARP entry or proxy ARP entry" flag bit in the corresponding entry.

206. Responding to the ARP request.

If the ARP request is a gateway ARP request or a proxy ARP request, the forwarding plane processor responds to the ARP request to the external device. The responding is implemented by: editing the ARP request to make the ARP request to be an ARP response, or creating a new ARP response whose source MAC address is the MAC address in this ARP entry. The edited ARP response or the newly created ARP response is sent through a port specified in the ARP entry.

In this embodiment, in the process of responding to the ARP request, the forwarding plane processor does not generate an ARP entry according to the source IP address or MAC address in the ARP request, but performs stateless processing for the ARP request.

207. Discarding the ARP request.

The received ARP request is discarded.

208. Judging whether the proxy ARP function is enabled on the interface which received the ARP request; if the ARP function is enabled, 209 is carried out; otherwise, 207 is carried out.

209. Limiting the speed of the ARP request and report the ARP request.

If the proxy ARP function is enabled on the interface which received the ARP request, the forwarding plane processor limits the speed of the ARP request, and then reports the to the control plane processor.

In this embodiment, how to judge that whether the ARP request is a gateway ARP request or a proxy ARP request may be implemented by: searching the forwarding table or other tables that include such information. The detailed process is similar to that in the foregoing embodiment.

In this embodiment, after the forwarding plane processor limits the speed of the received ARP request and reports the to the control plane processor in 209, the control plane processor handles the proxy ARP request, and then delivers the proxy ARP entry to the forwarding plane processor according to the configuration. The MAC address in the proxy ARP entry is the MAC address of the gateway. Subsequently, when the ARP request corresponding to the proxy ARP entry is received, the forwarding plane processor may handle the ARP request directly, without sending it to the control plane processor. Therefore, the processing speed is increased, and the capability of preventing ARP request attacks is enhanced in the case that the proxy ARP function is enabled.

In this embodiment, in the process of responding to the ARP request, the forwarding plane processor does not generate an ARP entry according to the source IP address or MAC address in the ARP request, thus preventing the ARP attacks which use ARP request to commit MAC address spoofing.

II. Processing an ARP Response

Figure 3:
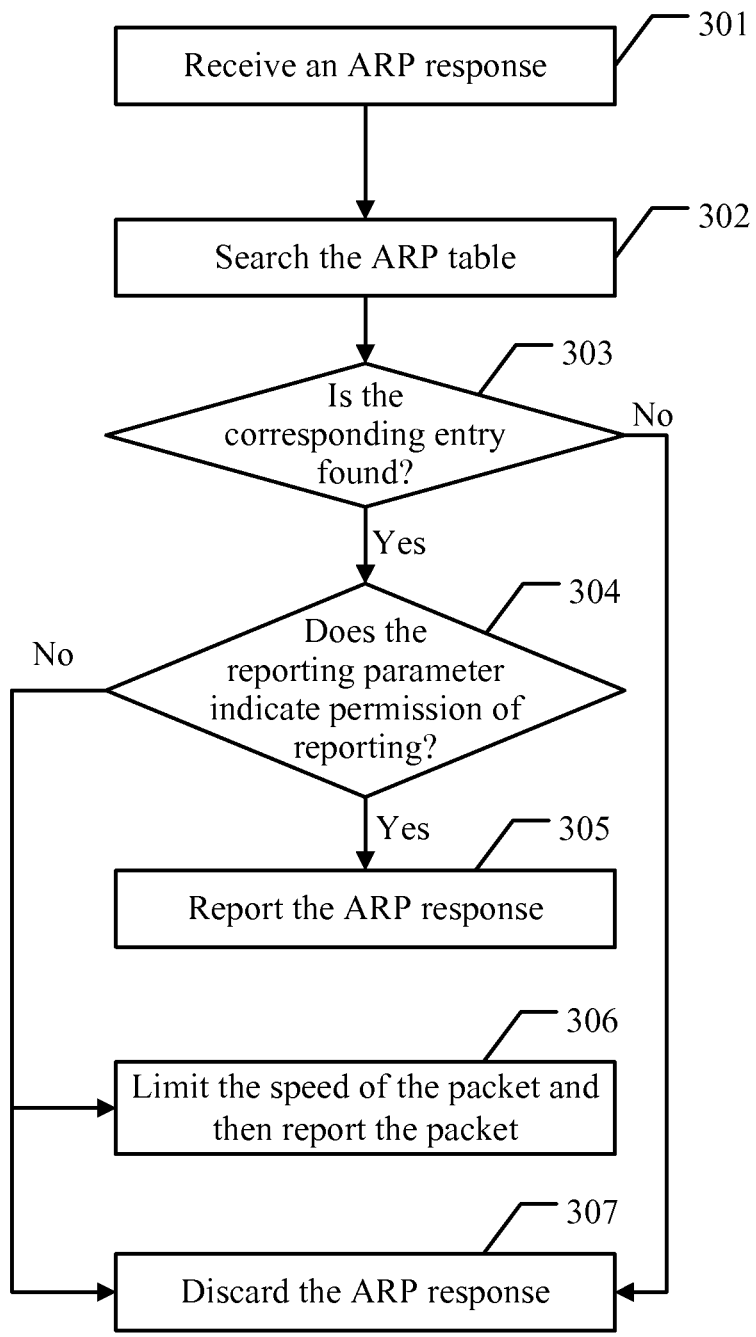
FIG. 3 is a flowchart of processing an ARP response in an embodiment of the present invention.

FIG. 3 is a flowchart of an ARP response processing method in an embodiment of the present invention. The method includes:

301. Receiving an ARP response.

The forwarding plane processor receives an ARP response sent by an external device.

302. Searching the ARP table.

The source IP address is obtained from the received ARP response, and the ARP table stored locally in the forwarding plane processor is searched according to the obtained source IP address.

303. Judging whether an entry corresponding to the obtained ARP response is in the ARP table; if so, 304 is carried out; otherwise, 307 is carried out.

304. Judging whether the reporting parameter in the entry corresponding to the ARP response indicates permission of reporting. If the reporting parameter indicates permission, 305 is carried out; otherwise, 306 or 307 is carried out.

305. Reporting the ARP response.

When the reporting parameter in the entry corresponding to the ARP response indicates permission of reporting, the forwarding plane processor reports the ARP response to the control plane processor.

In this embodiment, the forwarding plane processor reports the ARP response to the control plane processor. The control plane processor handles the ARP response, and then modifies the reporting parameter in the entry corresponding to the ARP response to "no permission of reporting" in the ARP table.

306. Limiting the speed of the ARP response and then report the ARP response.

The forwarding plane processor limits the speed of the ARP response according to the preset processing rule, and then report the ARP response to the control plane processor.

307. Discarding the ARP response.

In this embodiment, if the reporting parameter in the entry corresponding to the ARP response indicates no permission of reporting in 304, 306 or 307 is chosen to carry out according to the preset processing rule. For example, in normal circumstances, the MAC address of the device does not change frequently. Therefore, the discarding policy may be chosen. In special circumstances that the MAC address of the device is required to change frequently, the speed limiting policy may be chosen. The discarding policy is more effective than the speed limiting policy in preventing address spoofing. Therefore, the discarding policy is preferred except in special circumstances.

In this embodiment, the speed limiting policy or the discarding policy is implemented by searching relevant table. The type of the table is not limited herein.

Figure 4:
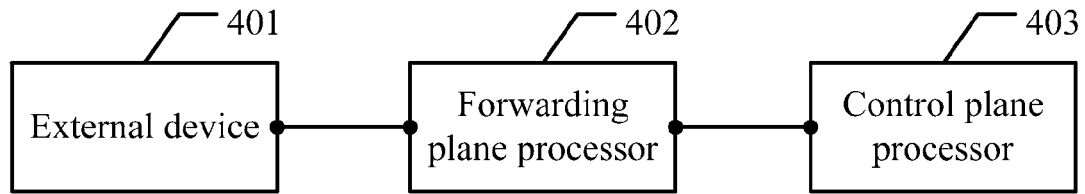
FIG. 4 shows a communication system in an embodiment of the present invention.

As shown in FIG. 4, a communication system provided in an embodiment of the present invention includes:

an external device 401, adapted to send an ARP request and an ARP response;

a forwarding plane processor 402, adapted to judge the type of the received ARP packet; when the ARP packet is an ARP request, search the local ARP table and respond to the ARP request according to the entry corresponding to the ARP request in the ARP table; when the ARP packet is an ARP response, search the local ARP table and judge whether the reporting parameter in the entry corresponding to the ARP response indicates permission of reporting according to the entry corresponding to the ARP response in the ARP table; if the reporting parameter indicates permission of reporting, report the ARP response; if no entry corresponding to the ARP response is found in the ARP table, discard the ARP response; and a control plane processor 403, adapted to receive the ARP request or ARP response reported by the forwarding plane processor 402.

Figure 5:
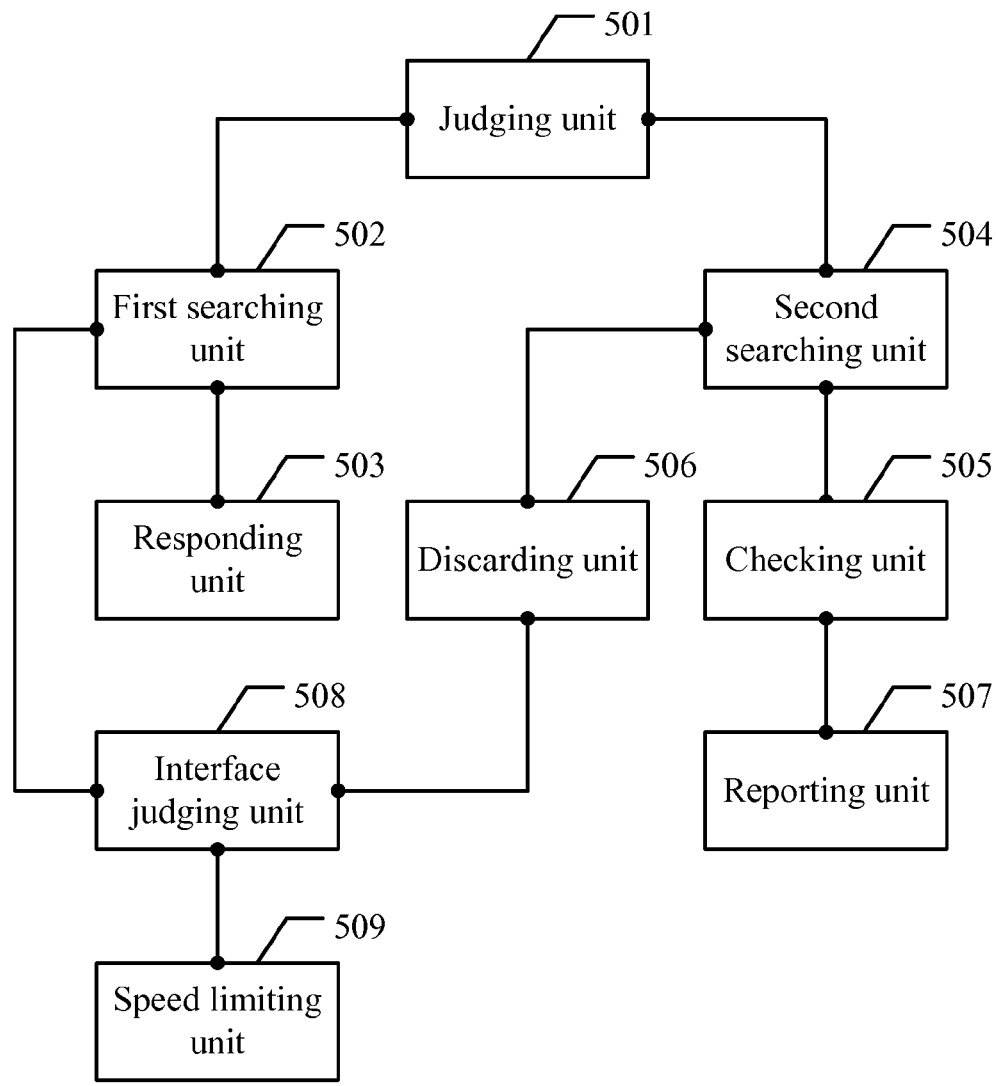
FIG. 5 shows a forwarding plane processor in an embodiment of the present invention.

FIG. 5 shows a forwarding plane processor in an embodiment of the present invention. The forwarding plane processor includes:

a judging unit 501, adapted to judge the type of a received ARP packet;

a first searching unit 502, adapted to search the local ARP table when the ARP packet is an ARP request;

a responding unit 503, adapted to respond to the ARP request if an entry corresponding to the ARP request is found in the ARP table;

a second searching unit 504, adapted to search the local ARP table when the ARP packet is an ARP response;

a discarding unit 506, adapted to discard the ARP response if no entry corresponding to the ARP response is found in the ARP table;

a speed limiting unit 509, adapted to limit the speed of the ARP packet and report the ARP packet to the control plane processor;

an interface judging unit 508, adapted to judge whether the proxy ARP function is enabled on the interface that receives the ARP request if no entry corresponding to the received ARP request is found in the ARP table; if the proxy ARP function is enabled, instruct the speed limiting unit 509 to limit the speed of the ARP packet and report the ARP packet; if the proxy ARP function is not enabled, instruct the discarding unit 506 to discard the ARP request;

a checking unit 505, adapted to judge whether the reporting parameter in the entry corresponding to the ARP response indicates permission of reporting when an entry corresponding to the ARP response is found in the ARP table; and a reporting unit 507, adapted to report the ARP response to the control plane processor when the reporting parameter in the entry corresponding to the ARP response indicates permission of reporting.

Several units that implement similar functions in the embodiments of the present invention may be combined into one unit in the practical application. For example, the first searching unit 502 and the second searching unit 504 may be implemented in one unit.

It is understandable to those skilled in the art that all or part of the steps of the method in the foregoing embodiments may be implemented through hardware instructed by a program. The program may be stored in a computer-readable storage medium. When being executed, the program performs these steps: The forwarding plane processor judges the type of a received ARP packet; when the ARP packet is an ARP request, the forwarding plane processor searches the local ARP table, and, if an entry corresponding to the ARP request is found in the ARP table, responds to the ARP request directly; when the ARP packet is an ARP response, the forwarding plane processor searches the local ARP table, and, if an entry corresponding to the ARP response is found in the ARP table, judges whether the reporting parameter in the entry indicates permission of reporting; if the reporting parameter indicates permission of reporting, the forwarding plane processor reports the ARP response to the control plane processor; if no entry corresponding to the ARP response is found in the ARP table, the forwarding plane processor discards the ARP response.

The storage medium may be a Read-Only Memory (ROM), a magnetic disk or a Compact Disk (CD).

Detailed above is an ARP packet processing method, a communication system and a forwarding plane processor under the present invention. Although the invention is described through several exemplary embodiments, the invention is not limited to such embodiments. It is apparent that those skilled in the art can make modifications and variations to the invention without departing from the spirit and scope of the invention. The invention is intended to cover such modifications and variations provided that they fall in the scope of protection defined by the following claims or their equivalents.

What is claimed is:

1. An Address Resolution Protocol (ARP) packet processing method, comprising:

receiving, by a forwarding plane processor, an ARP packet generated by an external network device;

judging, by the forwarding plane processor, whether the received ARP packet is an ARP request or an ARP response;

searching an entry corresponding to the received ARP packet in a local ARP table;

if the received ARP packet is the ARP response, and if the entry corresponding to the ARP packet is in the local ARP table, determining if a reporting parameter in the entry corresponding to the received ARP packet indicates a permission of reporting;

if the reporting parameter indicates the permission of reporting, reporting, by the forwarding plane processor, the ARP response;

if the reporting parameter indicates no permission of reporting, limiting, by the forwarding plane processor, a transmission rate of the ARP response, reporting, by the forwarding plane processor, the ARP response to a control- plane processor, and discarding, by the forwarding plane processor, the ARP response;

if the received ARP packet is the ARP response, and if no entry corresponding to the ARP packet is in the local ARP table, discarding, by the forwarding plane processor, the ARP response;

if the received ARP packet is the ARP request and if the entry corresponding to the received ARP packet is in the local ARP table, responding, by the forwarding plane processor, to the ARP request; and judging, by the forwarding plane processor, whether a proxy ARP function is enabled on an interface that receives the ARP request if no entry corresponding to the ARP request is found in the ARP table;

if the proxy ARP function is enabled, limiting, by the forwarding plane processor, a transmission rate of the ARP request, and then reporting the AR P request to the control plane processor; and if the proxy ARP function is not enabled, discarding, by the forwarding plane processor, the ARP request.

2. The ARP packet processing method of claim 1, further comprising:

if the received ARP packet is the ARP request, searching, by the forwarding plane processor, the ARP table according to a port number of the ARP request, a Virtual Local Area Network (VLAN) ID, and a destination Internet Protocol (IP) address.

3. The ARP packet processing method of claim 1, wherein before responding, by the forwarding plane processor, to the ARP request, the method further comprises:

if the entry corresponding to the ARP request is neither an ARP entry of a gateway entry nor a proxy ARP entry, discarding, by the forwarding plane processor, the ARP request.

4. The ARP packet processing method of claim 1, further comprising:
if the received ARP packet is an ARP response, searching, by the forwarding plane processor, the ARP table according to a source Internet Protocol (IP) address of the ARP response.

5. The ARP packet processing method of claim 1, wherein after reporting, by the forwarding plane processor, the ARP response, the method further comprises:
modifying, by a control plane processor, the reporting parameter in the entry corresponding to the ARP response in the ARP table to no permission of reporting.

6. A communication system, comprising:
a forwarding plane processor configured to:
receive an Address Resolution Protocol (ARP) packet;
judge whether the received ARP packet is an ARP request or an ARP response;
search an entry corresponding to the ARP packet in a local ARP table;
if the received ARP packet is the ARP response, and if the entry corresponding to the ARP packet is in the local ARP table, determine if a reporting parameter in the entry corresponding to the received ARP packet indicates a permission of reporting;
if the reporting parameter indicates the permission of reporting, report the ARP response;
if the reporting parameter indicates no permission of reporting, limit a transmission rate of the ARP response, report the ARP response to a control plane processor, and discard the ARP response; and
if the received ARP packet is an ARP response, and if no entry corresponding to the ARP packet is in the local ARP table, discard the ARP response; and
if the ARP packet is the ARP request and if the entry corresponding to the received ARP packet is in the local ARP table, respond to the ARP request;
judge whether a proxy ARP function is enabled on an interface that receives the ARP request when the one or more processors find no entry corresponding to the received ARP request in the ARP table;
if the proxy ARP function is enabled, limit a transmission rate of the ARP request and report the ARP request to the control plane processor; and
if the proxy ARP function is not enabled, discard the ARP request
wherein the control plane processor is configured to receive the ARP request or the ARP response reported by the forwarding plane processor.

7. A forwarding plane processor, comprising:
one or more processors; and
a memory for storing instructions, which, when executed by the one or more processors, cause the one or more processors to:
receive an Address Resolution Protocol (ARP) packet from an external network device;
judge whether the received ARP packet is an ARP request or an ARP response;
search an entry corresponding to the received ARP packet in a local ARP table;
if the received ARP packet is the ARP response, and if the entry corresponding to the received ARP packet is in the local ARP table, determine if a reporting parameter in the entry corresponding to the received ARP packet indicates a permission of reporting;
if the reporting parameter indicates the permission of reporting, report the ARP response;
if the reporting parameter indicates no permission of reporting, limit a transmission rate of the ARP response, report the ARP response to a control plane processor, and discard the ARP response; and
if the received ARP packet is the ARP response, and if no entry corresponding to the received ARP packet is in the local ARP table, discard the ARP response; and
if the received ARP packet is the ARP request, and if the entry corresponding to the received ARP packet is in the local ARP table, respond to the ARP request;
judge whether a proxy ARP function is enabled on an interface that receives the ARP request when the one or more processors find no entry corresponding to the received ARP request in the ARP table;
if the proxy ARP function is enabled, limit a transmission rate of the ARP request and report the ARP request to the control plane processor; and
if the proxy ARP function is not enabled, discard the ARP request.

* * * * *